(12) United States Patent
Ayres

(10) Patent No.: X8288
(45) Date of Patent: Jul. 8, 1834

(54) FILTERING APPARATUS

(76) Inventor: Littleton Ayres

Littleton Ayres — Baltimore — Maryland
Letters Patent
The Schedule referred to in these Letters Patent, and making part of the same containing a description in the words of the said Littleton Ayres himself of his improvement in the apparatus for filtering or clearing and purifying water, or other Liquids.—

To all to whom these presents shall come;

Be it known that I Littleton Ayres of Baltimore City in the County of Baltimore, and State of Maryland, have invented a new and useful improvement for filtering or clearing water, or other Liquids; and that the following is a true and exact description of the construction principles and operation of the machine as invented and improved by me. The machine to be constructed of any convenient form either cylindrical, square or otherwise; and placed in communication with a hydrant or reservoir, whose source is above the machine and its contents.— The principles are the Hydrostatic balance or percolation from below in combination with gravitation, and the mode of operation is by forcing upwards the water or other liquid through strata of charcoal, sponge, and sand or other filtering or clarifying agents. The water or other liquid to be admitted from the Hydrant or superior reservoir through a pipe into the Machine near its bottom, or lower compartment, to be constructed by a perforated board, or other separating substance, through which is to be passed a tube to admit a rod extending from the top to the bottom with traverse sticks attached thereto for the purpose of stirring or agitating the deposites of earthy matter and other impurities, so that they may be withdrawn through a cock or spigot, at pleasure.— Around the tube and on the board or other separating substance, is to be placed a perforated concentric cylinder of small dimensions, to be filled with sponge, and the whole to be surrounded with a stratum of charcoal— On the top of which is to be placed another board, or substance as aforesaid to support a stratum of clean sand,— the upper board, or other separating substance; to be perforated only above the smaller cylinder which contains the sponge; and the water or other liquid, being admitted below, is made to percolate and rise at the top, as a natural spring; from which it may be withdrawn for use, either as pure water for drinking, washing and Culinary purposes; Or as artificial water or other liquids, to be fabricated by placing sulphur ferruginous, or other mineral substances, upon the Charcoal, or other clarifying Agents. And I claim the invention of this improvement as respects the application of the hydrostatic balance, or percolation from below, by means of a superior source either natural or artificial, in combination with gravitation —

For further illustration of my invention and improvement as aforesaid a drawing and model are presented with the Specification, and the same are respectfully referred to.—

Witnesses
Josiah Bayly
Littleton Dennis Teackle

Littleton Ayres

Received and Recorded anew Sept.r 29. 1842
Exd. [illegible]

(528 words.)

Looked [illegible]
[illegible]